United States Patent [19]
Allread et al.

[11] 4,090,524
[45] May 23, 1978

[54] FRANGIBLE VALVED FITTING

[75] Inventors: Alan R. Allread, Jackson; Kenneth A. Levering, Jerome, both of Mich.

[73] Assignee: Aeroquip Corporation, Jackson, Mich.

[21] Appl. No.: 441,242

[22] Filed: Feb. 11, 1974

[51] Int. Cl.[2] .................. F16K 17/36; F16K 17/40
[52] U.S. Cl. .............. 137/68 R; 137/614.02; 285/2
[58] Field of Search ............. 285/2, 3, 4; 251/149.2; 137/68, 69, 71, 614, 614.02, 614.03, 797

[56] References Cited
U.S. PATENT DOCUMENTS

| 407,922 | 7/1889 | Brown | 137/614.03 |
| 3,542,047 | 10/1970 | Nelson | 137/68 |
| 3,719,194 | 3/1973 | Anderson et al. | 137/68 |
| 3,797,510 | 3/1974 | Torres et al. | 137/68 |
| 3,913,603 | 10/1975 | Torres | 137/68 R |

Primary Examiner—Martin P. Schwadron
Assistant Examiner—Richard Gerard
Attorney, Agent, or Firm—Beaman & Beaman

[57] ABSTRACT

A valved fitting for handling flowing fluids having another valved fitting or conduit attached thereto wherein a frangible interconnection is utilized. Upon the frangible connection fracturing, such action is sensed by valve operating means for closing the valve against fluid flow producing a self-sealing of the fitting. A flapper valve is utilized to seal the valve passage insuring maximum flow characteristics with a minimum of resistance during fluid flow.

The fitting utilizes unique frangible connection means wherein the connector is capable of fracturing under the influence of excessive forces imposed either axially or radially with respect to the fitting passage and flow path.

30 Claims, 10 Drawing Figures

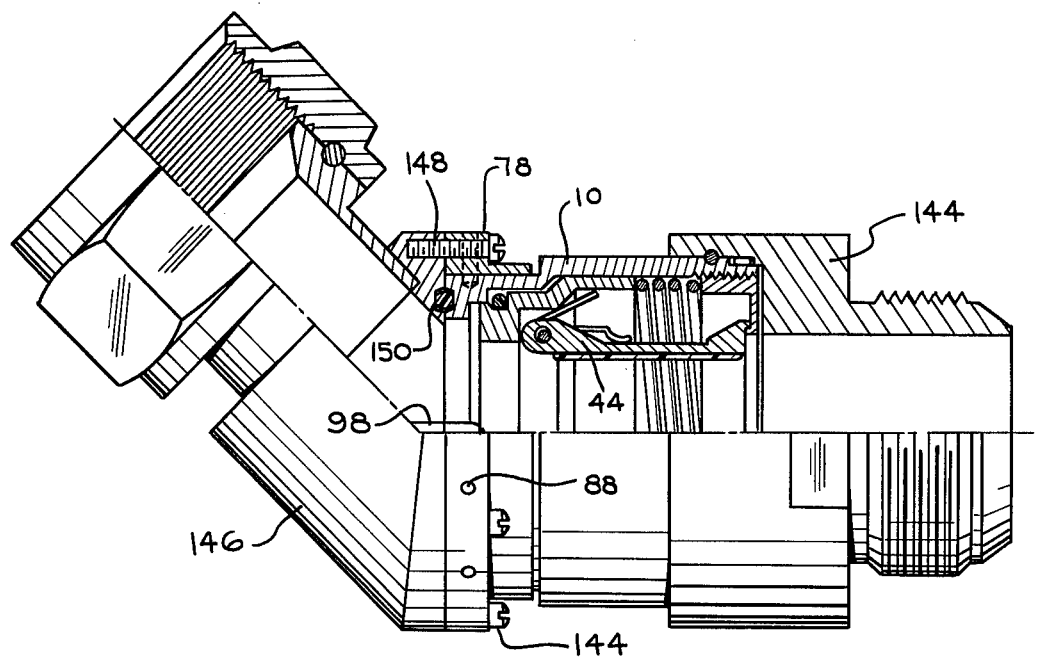
FIG. 8
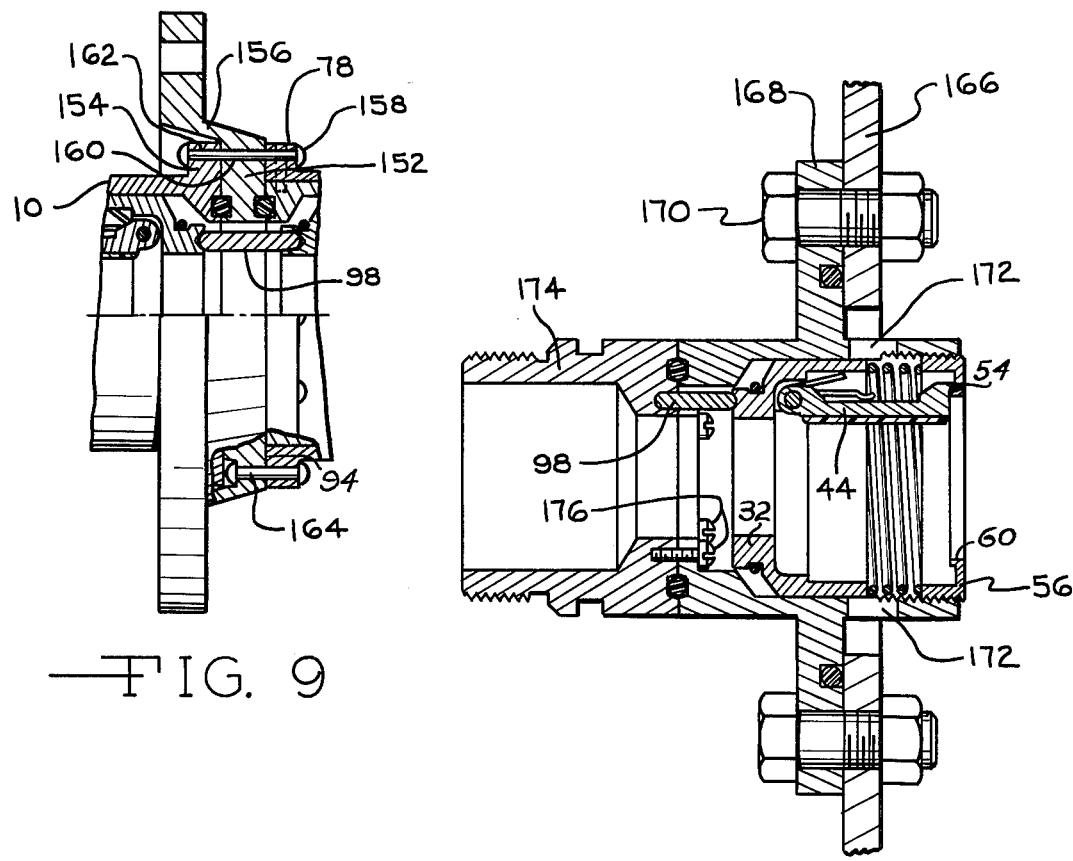
FIG. 9
FIG. 10

FRANGIBLE VALVED FITTING

BACKGROUND OF THE INVENTION

The invention pertains to frangible valved fittings which are self-sealing, and the frangible connectors therefor.

In the transporting of fluids, either liquids or gases, certain applications require that the fluid conduits be capable of fracturing at predetermined locations for safety purposes. Such requirements are common in the aircraft industry and in other applications wherein, in the event of accident, collision or crashes, it is desired that fuel lines, and other conduits containing inflammable liquids or gases, separate from tanks, reservoirs and other fittings and seal in order to minimize the spillage of inflammable liquids and reduce fire hazards, and improve the control of fires.

Also, frangible valved fittings are used to minimize the loss of control liquids, such as employed in hydraulic and air lines.

In the past, frangible valved fittings usually utilize poppet type valves placed within the fitting body passage. While such poppet valves are capable of sealing the fitting passage, their design and construction produces relatively high resistance to flow through the passage, and may create undesirable turbulence.

Also, known frangible valved fittings often utilize relatively close tolerances between components intended to move relative to each other during operation, and in view of the fact that long periods of time may exist between operation of the valve components of the fittings, the components may corrode or otherwise "freeze" relative to each other rendering the device inoperative when needed.

SUMMARY OF THE INVENTION

It is an object of the invention to provide a valve fitting which may be directly incorporated into a tank or reservoir, or incorporated as a hose fitting, which employs frangible connectors which will fracture under shear forces applied either axially or radially with respect to the flow passage through the fitting.

A further object of the invention is to provide a frangible fitting connector for conduit fittings and the like which is of an inexpensive construction, dependable in operation, versatile in use, and adaptable to variations of construction for utilization of the connector for fitting mounting purposes.

An additional object of the invention is to provide a self-sealing frangible valved fitting capable of handling pressurized medium wherein full flow may take place through the fitting with a minimum of flow resistance and turbulence.

Additionally, it is a purpose of the invention to provide a self-sealing frangible valved fitting which will be dependable over long periods of operation, and relatively moving components do not tightly fit together in a sealed relationship until the valve has closed.

In the practice of the invention the valved fitting utilizes a pivoted flapper type valve which is selectively positionable between the fully open position, out of the flow path through the fitting, and a closed position sealing the fitting passage against fluid flow. The valve is mounted upon an axially slidable ring within the fitting passage, and a retainer fixed within the fitting is utilized to hold the flapper valve in the open position. The relative position between the ring and the retainer is maintained by a sensing pin engaging the conduit to which the fitting is connected whereby fracturing of the fitting connection means releases the sensing pin permitting the ring and flapper valve to move away from the retainer under a spring biased force. Such operation causes the flapper valve to quickly close sealing the fitting against fluid flow.

The fitting utilizes an annular frangible connector having shearable elements. The frangible elements fracture under shear forces, and may be in the form of pins, screws or rivets. The connector orients the frangible elements either radially or parallel to the fitting passage, and the connector is so located upon the associated fitting that the frangible elements resist shear forces regardless as to whether radial or axial forces are imposed upon the conduit system with which the fitting is utilized.

BRIEF DESCRIPTION OF THE DRAWINGS

The aforedescribed objects and inventions will be apparent from the following description and accompanying drawings wherein:

FIG. 8 is a partially sectioned view of a valved fitting using an angled conduit associated therewith, FIG. 9 is a partially sectioned, detailed view of a further embodiment of frangible connector using the inventive concepts, and FIG. 10 is a diametrical, sectional view of a valved fitting in accord with the invention of the type as mounted in a tank or reservoir.

DESCRIPTION OF THE PREFERRED EMBODIMENTS

Figure 1:
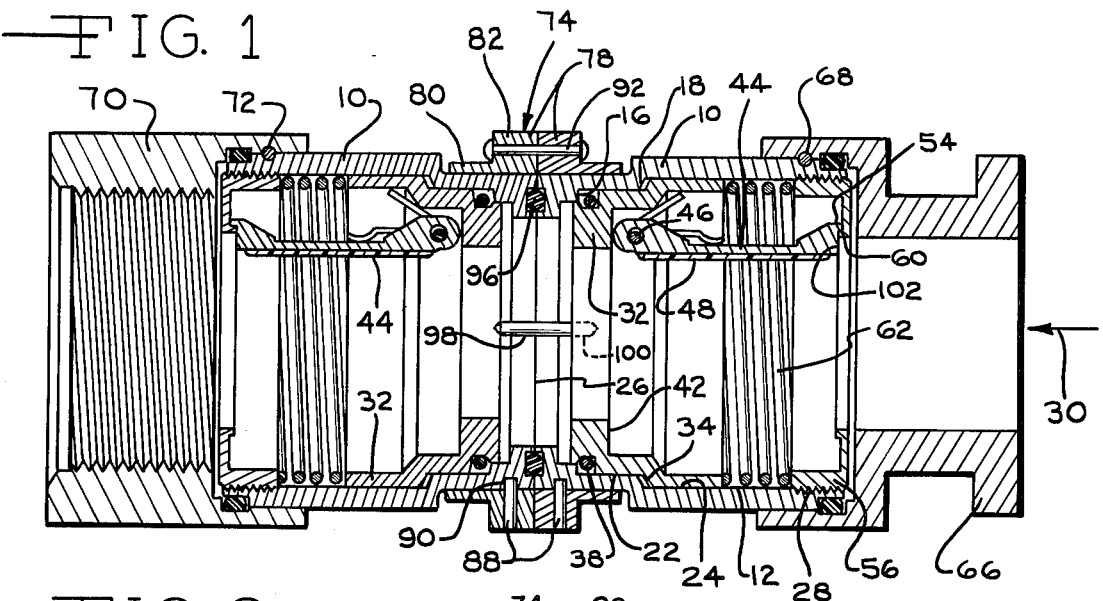
FIG. 1 is a diametrical, sectional view of a pair of interconnected frangible valve fittings illustrating the valves in the open position.

In the various embodiments illustrated similar valved fitting components are utilized with only minor variations, and in all the drawing figures, identical or substantially identical, components are identified by the same reference numerals.

The construction and operation of a valved fitting in accord with the invention will be appreciated with reference to FIGS. 1 through 4. In these figures two valved fittings are illustrated frangibly interconnected in end to end relationship. As the valved fittings are identical, except with respect to the conduit adapters attached thereto, a description of the components of one fitting suffices for both.

The valved fitting comprises an annular body 10 of a tubular configuration having an axial passage 12 defined therein which forms a passage for pressurized fluids thereby forming a flow path. Fittings in accord with the invention may be used to handle pressurized liquids, or gases, and are often used in aircraft fuel lines, hydraulic oil lines, and the like.

The fitting bore includes radial shoulders 14, 16 and 18, and cylindrical surfaces 20, 22 and 24. One end of the passage, and body is defined by a flat end surface 26, and at the other end of the fitting body passage is internally threaded at 28. With respect to the right fitting 10, FIG. 1, with fluid flow as indicated by arrow 30, the right end of the fitting at the threads 28 defines an inlet end of the passage 12, while the left end of the fitting constitutes an outlet end. For purposes of description, functionally equivalent ends of the valved fittings will be considered as outlet and inlet ends in that the flapper valves of the fitting are all oriented to prevent flow of fluid from the fitting once the frangible connector has been fractured.

An annular ring 32 is slidably mounted within the fitting passage and includes a shoulder 34 in opposed relationship to shoulder 18, and an annular shoulder 36 adjacent O-ring 38 which is in opposed relationship to shoulder 16. The ring 32 includes a bore 40 adjacent the flat valve seat surface 42.

Figure 2:
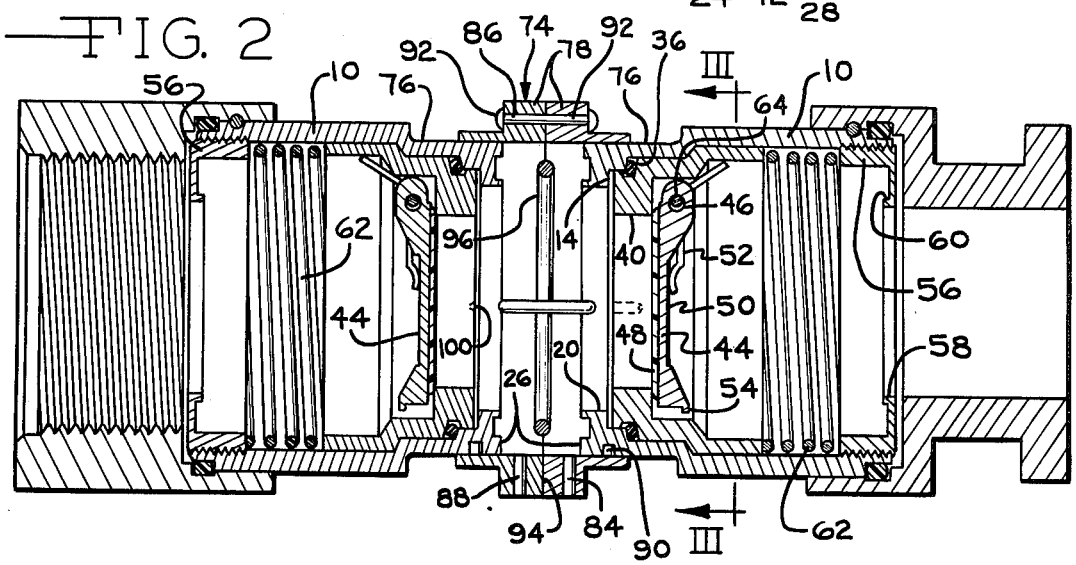
FIG. 2 is a view similar to FIG. 1 illustrating the relationship of the components upon shearing of the frangible elements under tension forces parallel with the flow path.
Figure 3:
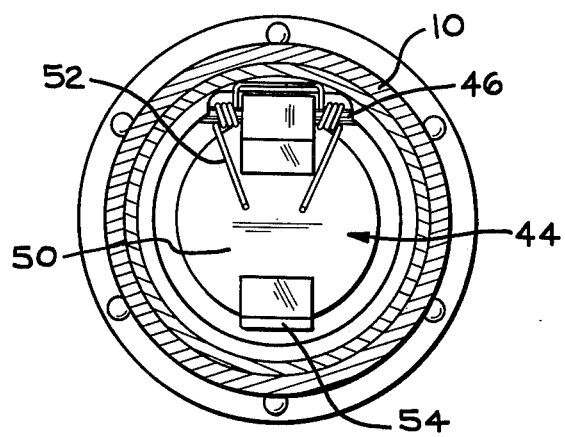
FIG. 3 is an elevational, sectional view as taken along section III—III of FIG. 2.
Figure 4:
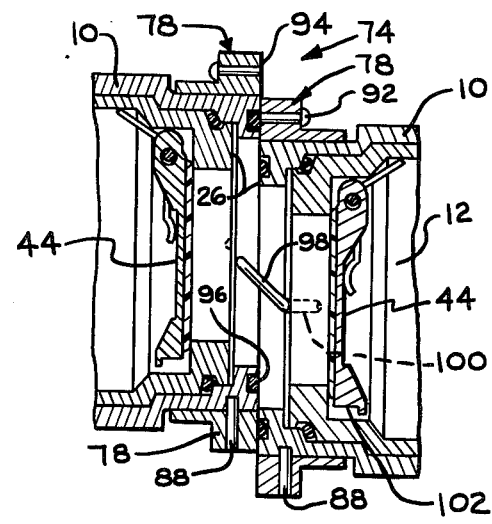
FIG. 4 is a detail, elevational, sectional view of the frangible fitting upon shearing of the frangible elements under shear force perpendicular to the fluid flow path.

The flapper valve 44 is pivotally mounted upon the ring 32 upon a pivot pin 46 perpendicularly disposed to the axis of the passage 12. The flapper valve 44 is of a generally circular configuration, FIG. 3, and includes a side upon which a resilient sealing material 48 is affixed. The pressurized side 50 of the valve is exposed toward the pressurized medium within the fitting body when the valve is in the closed position, and a torsion spring 52 wrapped about the pivot pin 46 includes ends bearing on the ring 32 and the side 50 to bias the flapper valve toward the closed condition as shown in FIGS. 2, 3 and 4. The flapper valve also includes a lip 54 at the location furtherest from the pivot pin 46 for cooperation with the retainer lip as will be described.

A retainer ring 56 is threaded into the fitting body threads 28 and is of an annular configuration having a concentric bore 58, and an axially extending lip 60 is defined upon the retainer ring. The radial location of the lip 60 is such that when the valve lip 54 rests upon the lip 60, as shown in FIG. 1, the flapper valve 44 is maintained well out of the flow path defined through the associated fitting and the plane of the flapper valve is substantially parallel to the axis of the passage 12.

A compression spring 62 is interposed between the retainer ring 56 and the ring 32 tending to bias the ring 32 to the position shown in FIG. 2.

The clearances between the ring 32 and the surfaces 20, 22 and 24 are relatively large in order to minimize the likelihood of the ring "freezing" due to corrosion or the like, with respect to the body 10. Thus, when the flapper valve 44 is open as shown in FIG. 1, the ring 32 is not sealed with respect to the body 10, and the O-ring 38 will be out of engagement with the shoulder 16 as illustrated in FIG. 1. However, when the ring 32 is shifted toward the fitting body left end, as in FIG. 2, the ring will be sealed with respect to the fitting body by the O-ring 38, and this dimensional relationship insures operation of the valved fitting over long periods of time.

Also, it is to be noted that the pivot hole 64 defined in the flapper valve 44 is a diameter substantially larger than the diameter of the pivot pin 46. Thus, the likelihood of corrosion between the flapper valve and its pivot is reduced, and this oversized relationship further insures the likelihood of a tight seal between the flapper valve and the valve seat 42 as the dimensional relationship of the pivot hole permits the flapper valve material 48 to conform to the configuration of the valve seat.

With respect to FIGS. 1 and 2, the right valved fitting has an adapter 66 mounted thereon by means of a sealing O-ring, and a locking wire ring 68. The left fitting 10 has an internally threaded fitting adapter 70 mounted thereon by an O-ring and a keying wire ring 72. As will be appreciated from the other embodiments illustrated in the drawings, the adapters mounted upon the fittings may take various forms and configurations well known within the art and are used to attach the valved fittings to hose lines, conduits, and the like, not shown.

As illustrated in FIGS. 1 through 4, the fitting bodies are mounted in end-to-end coaxial relationship by a frangible connector generally indicated at 74. The connector 74 consists of two identical annular collars. Each of the fitting bodies 10 is formed with a cylindrical concentric surface 76 intersecting the end surface 26, and a collar 78 is mounted upon this cylindrical surface. The collars 78 each include an axially extending cylindrical portion 80, and a radially extending portion 82. A plurality of radial holes 84 are formed in the radially extending collar portion 82 uniformly circumferentially spaced about the collar and a plurality of axially extending holes 86 are defined in the radially extending portion of the collars uniformly circumferentially spaced about the collar. Radically disposed frangible pins 88 are located within the radially extending holes 84 of the collars, and are received within blind, radially extending holes 90 defined in the fitting bodies. In this manner the collars are prevented from axial displacement with respect to their respective fitting.

Rivets 92 extend through the holes 86 defined in the radially extending portions of the frangible connector 74 and in this manner the collars 78 are firmly interconncted against relative displacement in an axial direction.

The collars 78 each include a radial end surface 94 and the end surfaces of the collars are maintained in engaged relationship by the rivets 92. Also, it will be noted from FIG. 1 that the collar end surfaces 94 are in alignment with the fitting end surfaces 26, which is important in order to permit the type of radial displacement illustrated in FIG. 4.

It will therefore be appreciated that the rivets 92 prevent displacement of the collars 78 with respect to each other in both radial and axial directions, while the pins 88 prevent axial displacement of the valved fittings with respect to each other.

The fitting's end surfaces 26 are each provided with a recess in which the O-ring 96 is received for sealing the valved fittings 10 with respect to each other.

The maintaining of the flapper valves 44 in the open position under normal operating conditions is achieved by a pair of diametrically opposed axially extending pins 98 having ends received within recesses 100 defined in the rings 32.

The right recess 100 is deeper than the left recess in order to hold the pins during assembly. The pins 98 are of such length, and the recesses received therein are of such depth, that when the valved fittings 10 are assembled in the manner of FIG. 1 the rings 32 will be displaced toward their associated retainer ring 56 sufficiently to permit the flapper valve lip 54 to rest upon the outer surface of the retainer ring lip 60 as illustrated in FIG. 1. The minimum spacing between the rings 32 and 56 is determined by engagement of the valve surface 102 with the edge of the ring lip 60.

The normal or open relationship of the valved fittings is illustrated in FIG. 1. In this relationship the pins 98 will maintain the rings 32 pushed toward their associated retainer ring 56 whereby the valve lips rest upon the retainer ring lips and the valves 44 will be in the open position permitting full fluid flow through the passages 12 of the valved fittings, and the adapters 66 and 70.

Should the axial tension forces applied to the fittings 10, such as would occur during an aircraft crash, or other mishap, reach a predetermined value the frangible pins 88 will shear. FIG. 2 illustrates the condition where the pins 88 have sheared at the junction of the inner surface of the collars 78 and the fitting surfaces 76 and the fittings 10 have begun to pull apart. In such instance the O-ring 96 will be removed from its associated groove defined in the fitting ends, and the pins 98 will fall from their receses 100. As the distance between the rings 32 has now increased greater than the length of the pins 98, the rings 32 will be biased toward the associated fitting ends 26 permitting the valve lip 54 to axially slip from the retainer lip 60 and the flapper valve springs 52, and pressure within the passage, will bias the flapper valves closed into sealed relationship with the valve seats 42, preventing flow of the fluid from the associated fitting body.

The biasing of the rings 32 by the springs 62 compresses the O-ring 38 between the shoulders 16 and 36 producing an effective seal of the passage 12. The pressurized medium within the passage 12 bearing upon the flapper valve side 50 very firmly forces the flapper valve 44 into engagement with the valve seat also insuring a tight seal. Of course, FIG. 2 merely illustrates the initial relationship of the frangible connector 74 with the fittings 10 during axial displacement and axial displacement usually continues to such an extent that the connector 74 will fall from the fittings. It is possible for the frangible shear pins 88 to shear with respect to only one fitting body surface 76, and in such instance the axial displacement of the fitting bodies permits the pins 98 to release the rings 32 and close the flapper valve as described.

In FIG. 4 displacement of the fitting bodies 10 is illustrated as caused by forces perpendicular to the axis of the valved bodies, and in such instances the rivets 92 will shear, rather than the shear pins 88. Such a displacement of the bodies 10 may shear the O-ring 96, and the pins 98 are received within their associated recesses 100 loose enough to permit such axial displacement without damage to the rings 32. As the pins 98 fall from their recesses, the rings 32 will be biased away from the associated retainer ring 56 permitting the flapper valves to close, as illustrated.

From the above description it will be appreciated that the connector 74 is effective to permit a frangible uncoupling of the valve bodies 10 regardless of whether the forces are axial or radial with respect to the flow path defined through the valve bodies. The pressures at which shearing of the pins 88 and rivets 92 occurs are regulated by the number of shear elements used, their composition, and their diameter.

Figure 5:
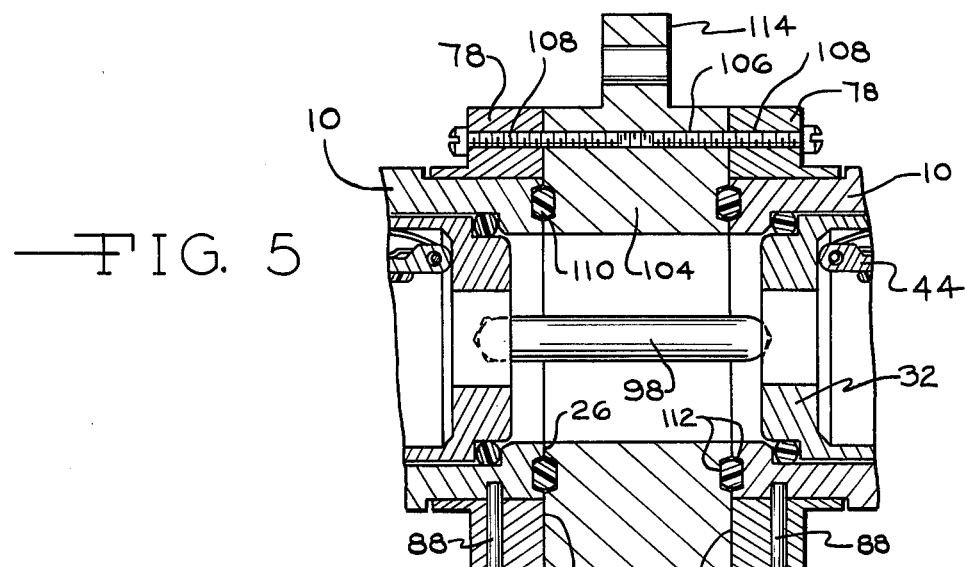
FIG. 5 is a detail, diametrical, sectional view of another embodiment of frangible connector in accord with the inventive concepts.

In FIG. 5 a variation of a frangible connector is illustrated as used with the valve bodies 10. In this embodiment an annular flanged spacer 104 is located intermediate the collars 78, and is provided with axially extending threaded holes 106 receiving the screws 108 extending through the collar holes 86. O-rings 110 received within annular grooves 112 seal the spacer 104 with respect to the valved fittings and the radially extending flange 114 is provided with mounting holes whereby the spacer may be used to mount the valved fittings to a wall, bulkhead or the like. The pins 88 are received within their holes 84 and 90, and under sufficient shear forces perpendicular to the axis of the valved fittings, the screws 108 will shear at the end edges 116 of the spacer 104. Under tension forces the pins 88 shear as described with respect to the embodiment of FIGS. 1 through 4.

Figure 6:
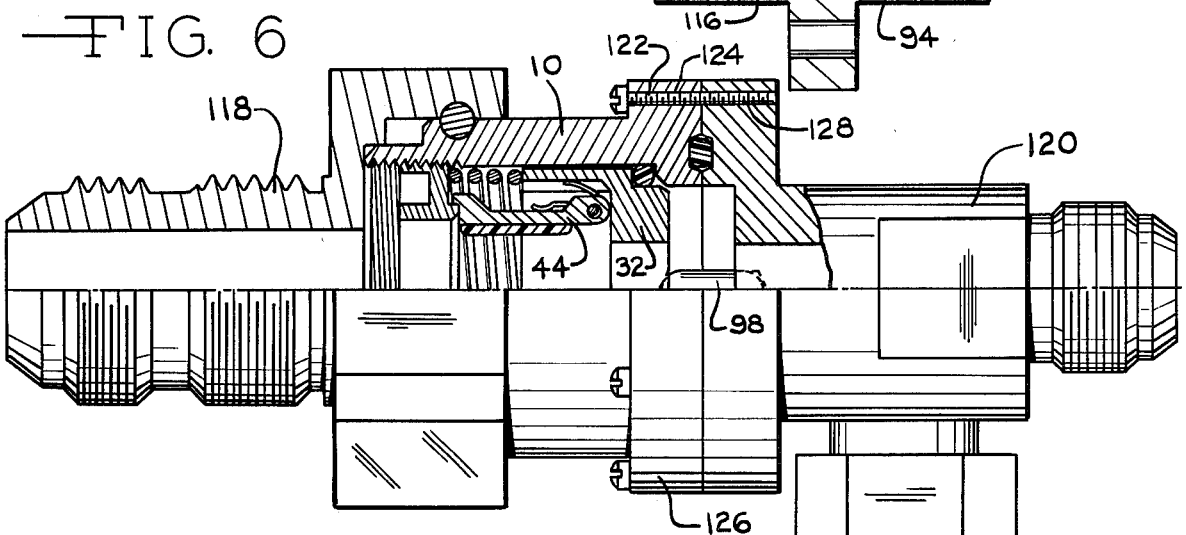
FIG. 6 is a partially sectioned view of another embodiment of valved fitting in accord with the invention.

In FIG. 6 the valved fitting 10 in accord with the invention is illustrated as used in conjunction with an externally threaded fitting 118, and a right angled 120 fitting. The fitting 120 is attached to the valved fitting body 10 by a plurality of threaded screws 122 received within holes 124 defined in body flange 126 and threaded holes 128 defined in fitting 120. In this embodiment the fitting 120 is frangible with respect to the valved fitting 10 only with respect to shear forces imposed transversely to the axis of the flow path through the valved fitting which would shear screws 122.

Figure 7:
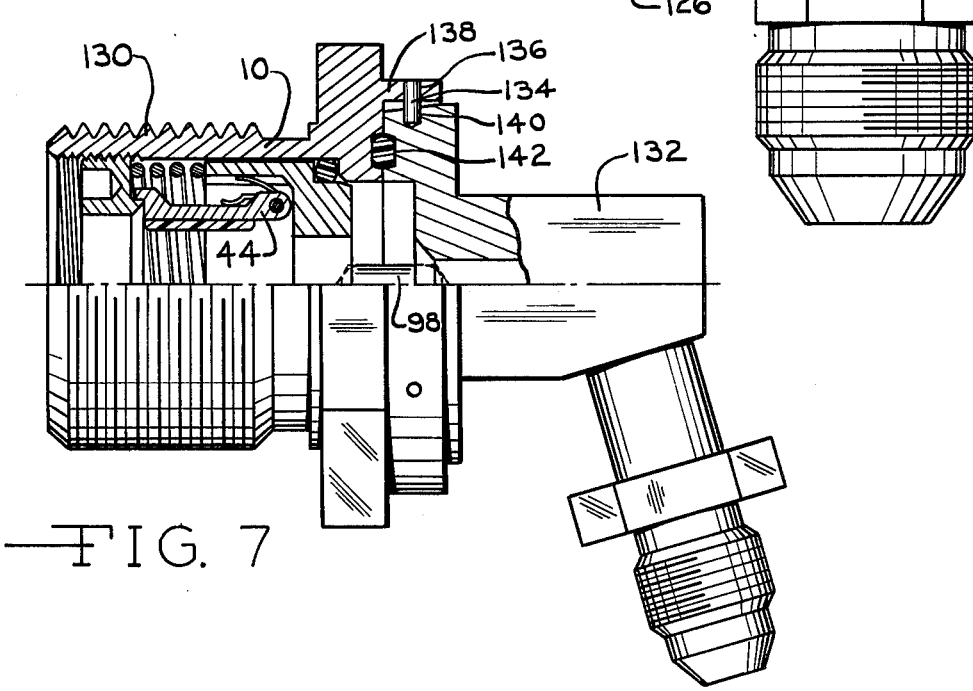
FIG. 7 is a partially sectioned view of a further embodiment of a valved fitting.

In FIG. 7 the valved fitting 10 is illustrated as having threads 130 directly defined on the body thereof for cooperation with the threaded fitting of a hose or similar conduit component. The fitting 132 is attached to the fitting body 10 by a plurality of radially extending shear pins 134 passing through holes 136 defined in the axially extending valved fitting portion 138 received in blind holes 140 in fitting 132. Sealing is maintained by the O-ring 142. In this embodiment only shear forces having components parallel to the axis of the fitting body 10 will permit shearing of the pins 134.

The embodiment of FIG. 8 is similar to the embodiment of FIG. 6 with respect to the use of an externally threaded adapter 144 being mounted upon the valved fitting body 10. An angled fitting 146 is attached to the other end of the body 10 by means of the frangible collar 78 connection. In this embodiment the collar 78 includes radially extending pins 88, and axially extending screws 148 threaded into the fitting 146. Sealing is maintained by the O-ring 150. In the embodiment of FIG. 8 the fitting 146 is frangibly connected to the body 10 for fracturing under either shear forces in a direction parallel to the axis of the body 10, or transverse thereto. Transverse shear forces will produce a shearing of the screws 148.

In FIG. 9 a mounting flange spacer 152 is interposed between a frangible connector collar 78 mounted upon the fitting 10, and the flange 154 formed on the left valved fitting. The mounting flange spacer 152 includes a radially extending offset portion 156, and rivets 158 extend through the collar 78, a hole 160 in the spacer, and a hole 112 defined in radially extending flange 154 defined upon the left fitting 10. Smaller rivets 164 connect only the spacer 152 to the collar 78, and shearing of the rivets 158 and rivets 164 under forces transverse to the axis of the fittings will occur only at the engaging surfaces of the spacer 152 and the end surface 94 of the collar.

FIG. 10 illustrates an embodiment of the invention wherein the valved fitting may be mounted in the wall of a tank or reservoir as represented at 166. The valved body includes a radially extending mounting flange 168 having holes defined therein for receiving mounting bolts or screws 170. Also, the body includes radially disposed holes 172 whereby fluid may enter the body passage as well as through the right end. The annular conduit adapter 174 is mounted to the end of the fitting body by a plurality of screws parallel to the axis of the valved fitting body passage, and the pins 98 maintain the ring 32 in the position whereby the flapper valve lip 54 rests upon the retainer lip 60. In this embodiment shearing of the screws 176 only occurs under forces having vectors transverse to the axis of the body passage.

It will be appreciated that in the embodiments of FIGS. 5–10 the pins 98 are used to hold the rings 32 in the "open" position and the pins will engage recesses defined in the adapter or fitting attached to the valved fitting.

It will also be appreciated from the illustrated embodiments that regardless of whether fracture of the frangible connectors occurs due to forces parallel or transverse to the valved fitting passage, the pins 98 will be sufficiently displaced, or removed from their associated recesses to permit the rings 32 to be biased by their associated compression spring permitting the flapper valve mounted thereon to close. Closing of the flapper valves 44 is automatic and instantaneous upon displacement of the frangible connector and thus a very minimum of fluid escapes upon the connector fracturing, which is most important if the connector is being used with fuel systems.

It will therefore be appreciated that the invention provides a self-sealing valved fitting utilizing frangible connectors which is concise in configuration, economical in manufacture, dependable in operation and automatic. Modifications to the described embodiments may be apparent to those skilled in the art without departing from the spirit and scope of the invention.

We claim:

1. A frangible valved fitting comprising, in combination, a valve body having a passage defined therein defining a flow path and having an inlet and an outlet, frangible means connecting said valved body to conduit means, a flapper valve within said passage pivotally mounted within said body upon a pivot axis transversely disposed to said passage for movement between open and closed positions, valve seat means defined within said passage cooperating with said flapper valve when in said closed position to close said passage, valve retaining means within said passage releasably retaining said flapper valve in said open position, and flapper valve operating means sensing connection of said body to said conduit means and controlling operation of said retaining means permitting said retaining means to release said flapper valve to close said passage upon fracturing of said frangible means.

2. In a frangible valved fitting as in claim 1, biasing means biasing said flapper valve toward said closed position.

3. In a frangible valved fitting as in claim 1 wherein said flapper valve includes a pressure side and a valve seat side, said pressure side being disposed toward said passage inlet and said seat side being disposed toward said outlet and engaging said valve seat when said flapper valve is in said closed position whereby pressurized medium within said passage aids in maintaining said flapper valve in the closed position.

4. In a frangible valved fitting as in claim 1, displacement means within said passage permitting relative displacement between said flapper valve and said valve retaining means, said valve operating means controlling displacement of said flapper valve relative to said retaining means to release said flapper valve from said retaining means.

5. In a frangible valved fitting as in claim 4 wherein said displacement means includes an annular ring axially slidably supported within said valve body passage, said valve seat means being defined on said ring and said flapper valve being pivotally mounted on said ring, biasing means biasing said ring away from said retaining means, said flapper valve operating means including ring positioning means interposed between said ring and the conduit means maintaining a predetermined spacing between said ring and said retaining means to maintain said flapper valve in the open position.

6. In a frangible valved fitting as in claim 5 wherein said ring positioning means comprises at least one pin interposed between said ring and the conduit means.

7. In a frangible valved fitting as in claim 1 wherein the conduit means comprises a second valve body substantially identical in construction to said valved body.

8. In a frangible valved fitting as in claim 7 wherein said flapper valve operating means of said valve bodies include at least one common element.

9. A frangible valved fitting comprising, in combination, a valve body having a passage defined therein defining a flow path and having an inlet and an outlet, frangible means connecting said valve body to conduit means, an annular ring defined in said passage adjacent said outlet and axially slidable within said passage between first and second positions, an annular valve seat defined on said ring, a flapper valve pivotally mounted on said ring having a closed position engaging said valve seat and sealing said passage, a flapper valve retainer within said passage axially spaced from said ring in the direction of said inlet, said flapper valve being located between said valve seat and retainer and said flapper valve engaging said retainer at said ring first position to hold said flapper valve in an open position substantially removing said flapper valve from the flow path defined by said passage, biasing means engaging said ring biasing said ring toward said second position away from said retainer, and flapper valve operating means sensing connection of said valve body to the conduit means engaging said ring and maintaining said ring in said first position and being releasable from such engagement upon fracture of said frangible means, release of said operating means permitting shifting of said ring to said second position under the influence of said biasing means releasing said flapper valve from said retainer to pivot to its closed position.

10. In a frangible valved fitting as in claim 9, sealing means sealing said ring with respect to said passage at said ring second position.

11. In a frangible valved fitting as in claim 9 wherein said retainer includes an axially extending lip extending toward said ring, and lip engaging means defined upon said flapper valve.

12. A frangible valved fitting coupling comprising, in combination, a pair of valved bodies each having a passage defined therein defining a flow path and each having an interconnectible end, frangible means connecting said valved bodies in end-to-end relationship aligning the passages thereof, a flapper valve within the passage of each body pivotally mounted within the associated body upon a pivot axis transversely disposed to the associated passage for movement between open and closed positions, valve seat means defined within each passage cooperating with the associated flapper valve when in said closed position to close the associated passage, valve retaining means within each passage releasably retaining the associated flapper valve in its open position, and flapper valve operating means sensing interconnection of said bodies and controlling operation of said retaining means to release said flapper valves to close said passages upon fracturing of said frangible means.

13. In a frangible valved fitting coupling as in claim 12 wherein said flapper valve pivot axes and valve seat means are located adjacent the associated body end, said flapper valves each including a pressure side and a valve seat side, said valve seat side disposed toward the associated body interconnectible end when said valves are in the closed position whereby pressurized medium within said body passages aids in maintaining said flapper valves in the closed position.

14. In a frangible valved fitting coupling as in claim 12, displacement means within each of said valved body passages permitting relative displacement between the associated flapper valve and the associated valve retaining means, said valve operating means controlling displacement of the associated flapper valve relative to the associated retaining means to release the associated flapper valve from its retaining means.

15. In a frangible valved fitting coupling as in claim 14 wherein said displacement means each include an annular ring axially slidably supported within its associated valve body passage, said valve seat means of the associated body being defined on the associated ring and the associated flapper valve being pivotally mounted upon such ring, biasing means biasing said rings away from the associated retaining means, said flapper valve operating means including ring positioning means interposed between said rings of said bodies maintaining a predetermined spacing between said rings and the associated retaining means to maintain the associated flapper valve in the open position.

16. In a frangible valved fitting coupling as in claim 15 wherein said ring positioning means includes at least one member extending in the direction of the length of said passage interposed between the rings within said bodies.

17. A crashworthy valve comprising:
body means having a passage therethrough, said body means including first and second sections and a frangible region therebetween which allows relative movement between said sections when said sections are subjected to a predetermined load;
means defining a valve seat in each said section;
at least one valve element cooperating with the associated valve seat in each said section;
means for mounting each said valve element for pivotable movement about a pivot axis between an open position in which the valve element is spaced from the associated valve seat and a closed position in which the valve element is in engagement with the associated valve seat to close said passage at each said valve seat;
means in the passageway in each section for releasably holding each said valve element in said open position; and
means responsive to relative movement between said sections for freeing each said valve element from the holding action of each said holding means whereby each said valve element is freed for movement to said closed position.

18. A crashworthy valve as defined in claim 17 wherein each said pivot axis extends generally transverse to the axis of said passage, each said pivot axis being adjacent the periphery of said passage.

19. A crashworthy valve as defined in claim 17 wherein each said holding means includes means carried by said body means for engaging each said valve element to hold each said valve element in said open position, and each said freeing means includes means responsive to the relative movement between said sections for allowing relative movement between each said valve element and each said associated engaging means to disengage each valve element and the associated engaging means.

20. A crashworthy valve comprising:
body means having a passage therethrough, said body means including first and second sections and a frangible region therebetween which allows relative movement between said sections when said body means is subjected to a predetermined load;
means defining spaced valve seats in said passage and cooperating with each said section;
spaced carriers in said passage cooperating with the associated valve seat;
means for mounting each said carrier for movement along a path in said passage;
at least one valve element associated with each carrier and valve seat;
means for mounting each said valve element for pivotal movement relative to said associated carrier between an open position in which the valve element is spaced from the associated valve seat and a closed position in which the valve element is in engagement with said associated valve seat to close said passage at said valve seat, each said valve element being movable with the associated carrier along said path;
means for releasably holding each said valve element in said open position, said holding means being responsive to movement of each said valve element and the associated carrier along said path to release the associated valve element to allow the said valve element to be moved to the closed position; and
releasable means for retaining each said carrier against sufficient movement along said path to release the associated valve element, said releasable retaining means being responsive to relative movement between said sections to release the associated carrier for sufficient movement along said path to release the associate valve element from the associated holding means.

21. A crashworthy valve as defined in claim 20 wherein each said carrier includes a piston and said path is substantially linear.

22. A crashworthy valve as defined in claim 20 wherein each said valve seat is on the associated carrier.

23. A crashworthy valve as defined in claim 20 wherein each said retaining means includes means carried by said body means for defining a ledge, a portion of each said valve element being supported on the associated ledge in said open position, the movement of said valve element with said associated carrier along said path freeing said valve element from the associated ledge.

24. A crashworthy valve as defined in claim 20 including resilient means associated with each valve element for urging the associated valve element to pivot from said open position toward said closed position and resilient means for urging each said carrier along said path in a direction to release the associated valve element.

25. A crashworthy valve as defined in claim 24 wherein each valve element pivots about a pivot axis in moving between said positions thereof, said pivot axis extends generally transverse to the axis of said passage, and each said retaining means including means carried by said body means for defining a ledge associated with each valve element, at least a portion of each said valve element being supported on the associated ledge in said open position, the movement of each said valve element with the associated carrier along said path freeing said valve element from the associated ledge to thereby release said valve element for movement toward the closed position.

26. A crashworthy valve as defined in claim 20 wherein said means for mounting said valve element mounts said valve element on said carrier.

27. A crashworthy valve comprising:
body means having a passage therethrough, said body means including first and second sections and a frangible region therebetween which allows relative movement between said sections when said sections are subjected to a predetermined load;
means in each section defining a valve seat;
means in each section for mounting the valve element for pivotal movement between an open position in which the valve element is spaced from the valve seat and a closed position in which the valve element is in engagement with said valve seat;
resilient means in each section for urging the valve element to said closed position;
holding means in each section for holding the valve element in said open position;
each said valve element being movable in a first direction to a releasing position in response to a predetermined amount of said relative movement between said sections, each said valve element being spaced from said valve seat in said releasing position; and
each said valve element being freed of said holding means in response to said valve element reaching said releasing position whereby the movement of said valve element to said releasing position causes the release of said valve element and allows said resilient means to subsequently move the valve element to the closed position.

28. A crashworthy valve comprising:
body means having a passage therethrough, said body means including first and second sections and a frangible region which allows relative movement between said sections when said sections are subjected to a predetermined load;
a first valve element; means for mounting said first valve element for movement along a first path;
first mounting means for mounting said first valve element for pivotal movement about a first pivot axis between an open position and a closed position;
first holding means for releasably holding said first valve element in the open position thereof, said first holding means being releasable in response to movement of said first valve element along said first path toward said second section;
a second valve element;
means for mounting said second valve element for movement along a second path;
second mounting means for mounting said second valve element for pivotal movement about a second pivot axis between an open position and a closed position;
second holding means for releasably holding said second valve element in the open position thereof, said second holding means being releasable in response to movement of said second valve element along said second path toward said first section; and
cooperating means for preventing sufficient movement of said first and second valve elements along their respective paths to release said first and second valve elements, said cooperating means being responsive to said relative movement between said sections for allowing said first and second valve elements to move along their respective paths to release said valve element.

29. A crashworthy valve as defined in claim 28 wherein said means for mounting the first valve element for movement along a first path includes first carrier means and said means for mounting the second valve element for movement along a second path includes second carrier means, said crashworthy valve including means for urging said first and second carrier means toward each other, said first carrier means and said second carrier means being drivingly interrelated whereby movement of said first and second carrier means toward each other is substantially prevented.

30. A crashworthy valve comprising:
body means having a passage therethrough, said body means including first and second sections and a frangible region which is breakable to allow separation of said sections when said sections are subjected to a predetermined load;
means defining a valve seat in said passage on each side of said frangible region;
a movable member cooperating with each said valve seat;
first means for mounting each said movable member on said body means for movement along a path relative to said body means between the first and second positions;
at least one valve element cooperating with each valve seat;
means for mounting each said valve element on the associated movable member for pivotal movement about a pivot axis;
each said valve element having an open position in which the valve element is spaced from the associated valve seat and a closed position in which the valve element is in engagement with the associated valve seat;
means for releasably retaining each said valve element in said open position and each said movable member in said first position; and
means responsive to the separation of said sections for freeing each said movable member for movement to said second position and each said valve element for movement to the closed position.

* * * * *